United States Patent
Zhang (10) Patent No.: US 10,033,863 B1
(45) Date of Patent: Jul. 24, 2018

(54) DETERMINING PORTING HISTORIES FOR TELEPHONE NUMBERS

(71) Applicant: Neustar, Inc., Sterling, VA (US)

(72) Inventor: Ning Zhang, Ashburn, VA (US)

(73) Assignee: Neustar, Inc., Sterling, VA (US)

( * ) Notice: Subject to any disclaimer, the term of this patent is extended or adjusted under 35 U.S.C. 154(b) by 0 days.

(21) Appl. No.: 15/451,102

(22) Filed: Mar. 6, 2017

(51) Int. Cl.
*H04M 7/00* (2006.01)
*H04M 15/00* (2006.01)
*H04M 3/42* (2006.01)
*H04L 29/12* (2006.01)
*G06F 17/30* (2006.01)

(52) U.S. Cl.
CPC .. *H04M 3/42297* (2013.01); *G06F 17/30477* (2013.01); *G06F 17/30551* (2013.01); *G06F 17/30607* (2013.01); *H04L 61/605* (2013.01)

(58) Field of Classification Search
CPC ........................ H04M 3/42297; H04M 3/4228
USPC ...... 379/221.13, 221.14, 201.01, 219, 112.1, 379/111, 127.01, 112.01
See application file for complete search history.

(56) References Cited

U.S. PATENT DOCUMENTS

2003/0133450 A1* 7/2003 Baum ............... H04L 29/12018
370/389
2006/0023854 A1* 2/2006 Moisan .................. H04Q 3/005
379/112.1

* cited by examiner

*Primary Examiner* — Thjuan K Addy
(74) *Attorney, Agent, or Firm* — Perkins Coie LLP (57) ABSTRACT

Systems and methods for constructing the porting history for a telephone number, and identifying porting information at certain points in time for the telephone number. For example, in some embodiments, the systems and methods receive a query for porting history information associated with a telephone number and access an object database of objects that represent telephone numbers and associated information for the telephone numbers, where the database stores data representative of events over a time period that occurred with respect to the telephone number. Via the accessed information, the systems and methods generate a timeline for the telephone number based on information stored by the object database, where the generated timeline is separated into time periods representative of the events that occurred with respect to the telephone number, and construct a porting history record for the telephone number that is based on the timeline generated for the telephone number. The systems and methods may then provide the porting history record to the requesting party.

20 Claims, 6 Drawing Sheets

FIG. 1

| Parent: Role | Intern | Contractor | Employee | | |
|---|---|---|---|---|---|
| Parent: Job Title | | | Engineer | | Manager |
| Parent: Department | Engineering | | Operation | | Support |
| Attribute: Special Privilege | | | | Access to Data Center | |
| TIME LINE | Period 1 | Period 2 | Period 3 | Period 4 | Period 5 | Period 6 | Period 7 | Period 8 |

DETERMINING PORTING HISTORIES FOR TELEPHONE NUMBERS

BACKGROUND

Telephone numbers, throughout their lifetimes, are often transferred from one service provider to another, from one network endpoint to another, from one device to another, and so on. In order for a user (owner) to maintain control of his/her number, LNP, or local number portability, is a system that enables end users to keep their telephone numbers when switching from one communications service provider to another.

Although LNP facilitates the porting of telephone numbers between service providers, there are times when it may be useful to identify or determine certain information about a telephone number during its lifetime or history of use. Typically, such records exist, but attempting to identify service provider or other information associated with a telephone number at a certain point in time may be difficult or inefficient.

BRIEF DESCRIPTION OF THE DRAWINGS

Embodiments of the disclosed technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods for constructing the porting history for a telephone number, and identifying porting information at certain points in time for the telephone number, are described.

For example, in some embodiments, the systems and methods receive a query for porting history information associated with a telephone number and access an object database, or object store, of objects that represent telephone numbers and associated information for the telephone numbers, where the database stores data representative of events over a time period that occurred with respect to the telephone number. Via the accessed information, the systems and methods generate a timeline for the telephone number based on information stored by the object database, where the generated timeline is separated into time periods representative of the events that occurred with respect to the telephone number, and construct a porting history record for the telephone number that is based on the timeline generated for the telephone number. The systems and methods may then provide the porting history record to the requesting party.

In some embodiments, the systems and methods provide systems that enable the extraction and retrieval of historical information for objects having dynamic inheritances, enabling requesting parties to obtain information from various time periods for the objects, among other benefits.

In order to construct the porting history of telephone numbers, the systems and methods perform temporal or time-specific data extraction for objects having dynamic inheritances (e.g., such as telephone numbers). The systems and methods may store and/or utilize change or event information associated with objects (e.g., objects in an object database or object store), such as changes to inheritances (e.g., changing from one parent object to another) for an object, changes to attributes for the object, and so on. Based on the change information, the systems and methods may generate event sequences for objects and evaluate queries (e.g., queries for information about the objects at various historical time periods) associated with the objects using the generated sequences.

As will be shown herein, dynamic inheritance refers to objects (or their inheritances) changing and/or evolving over time, where an object may inherit attributes and/or behaviors from parent objects and may change associations with parent objects, resulting in variations of the attributes or behaviors of an object at different periods of time.

In some embodiments, the systems and methods determine or provide information for an object stored in a database that has dynamic inheritances. The systems and methods may access and/or create a data set of events associated with the object having dynamic inheritances, where an event is a change to an attribute or a change to an inheritance for the object at a specific point in time. Then the systems and methods may generate a temporal sequence of events for the object having dynamic inheritances, which includes a timeline separated into time periods representative of the events associated with the object. Using the generated sequence of events, the systems and methods may evaluate a query for information (e.g., from a specific time period) associated with the object having dynamic inheritances and return answers to the query that are based on information from the sequence of events.

The systems and methods may perform data extraction for various different objects and/or information represented or stored by the objects in the object database or other database or data store. As described herein, one such application is associated with providing porting history information for a telephone number in response to requests, such as requests received from law enforcement or other requesting parties.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Many aspect of the systems and methods described herein are directed to applications associated with constructing, generating, and/or determining porting history information for telephone numbers. These applications utilize systems and processes that, in the generalized case, facilitate temporal data extraction for objects having dynamic inheritances. Therefore, what follows is a description of various systems associated with extracting temporal data for objects having dynamic inheritances (e.g., including the construction of data sequences and other data structures). Applications of such temporal extractions, such as those directed to telephone numbers and their associated porting histories, are described herein.

Dynamic Inheritances of Objects, Such as Telephone Numbers

As described herein, the systems and methods facilitate the construction of historical information for objects having changed or dynamic inheritances, such as the construction of porting history information for telephone numbers. The construction of information for objects having dynamic inheritances facilitates number porting determinations, which are described herein.

Figure 1:
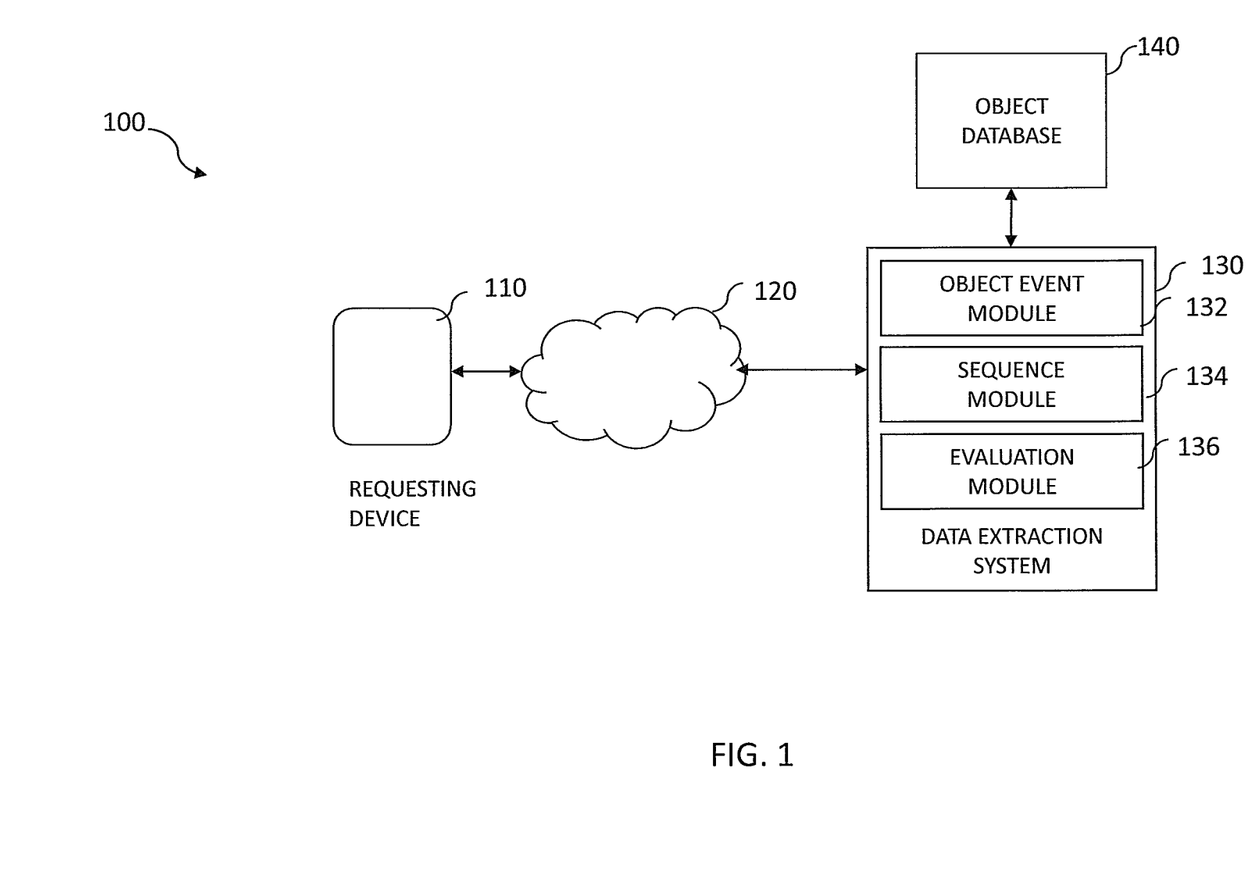
FIG. 1 is a block diagram illustrating a computing environment for facilitating temporal data extraction for objects having dynamic inheritances.

FIG. 1 is a block diagram illustrating a computing environment 100 for facilitating temporal data extraction for objects having dynamic inheritances. An object database 140 or object store, such as an object-oriented or object-relational database, stores objects, such as variables, data structures, tables, functions, and so on. A data extraction system 130, which incorporates some or all of the modules or aspects described herein, communicates with the database 140 to create, modify, store, obtain, or retrieve data within, to, and/or from the database 140.

For example, the data extraction system 130, in response to receiving a query from a requesting device 110 (e.g., a query received over a network 120, such as the Internet) for information associated with an object, may access temporal data stored in the database 140 for various objects of the database 140, generate event or change sequences associated with changes to the objects of the database 140, and output information based on the event sequences that satisfy the query.

As described herein, objects may have dynamic inheritance or inheritances associated with changing attributes, services, methods, properties, classes, and/or relationships between the object and other objects within the database. The system 130, therefore, may track in the object database 140, via various data objects or structures, events or changes representative of the dynamic inheritances for objects. Utilizing these change events, the system 130 constructs historical records or sequences for the dynamic inheritances and/or attributes assigned to the object and provides results to queries for information about the object based on the information within the constructed historical records. Further details regarding the functionality of the data extraction system 130 are described herein.

FIG. 1 and the discussion herein provide a brief, general description of the components of the computing environment 100. Although not required, aspects of the computing environment 100 are described in the general context of computer-executable instructions, such as routines executed by a general-purpose computer, e.g., a mobile device, a server computer, or a personal computer. The system can be practiced with other communications, data processing, or computer system configurations, including Internet appliances, hand-held devices (including tablet computers and/or personal digital assistants (PDAs)), all manner of cellular or mobile phones (e.g., smartphones), multi-processor systems, microprocessor-based or programmable consumer electronics, set-top boxes, network PCs, mini-computers, mainframe computers, and the like. Indeed, the terms "computer," "host," "host computer," "mobile device," and "handset" are generally used interchangeably herein and refer to any of the above devices and systems, as well as any data processor.

Aspects of the environment 100 can be embodied in a special-purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer-implemented instructions, data structures, screen displays, and other data under aspects of the system may be distributed over the Internet or over other networks (including wireless networks), on a propagated signal on a propagation medium (e.g., an electromagnetic wave, a sound wave, etc.) over a period of time, or they may be provided on any analog or digital network (packet-switched, circuit-switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Returning to the systems and methods described herein, the inheritance of objects (e.g., a variable, data structure, table, function, and so on) involves one object or class being based on a previous object or objects or class or classes. For example, in object-oriented programming, mapping objects with other objects (and classes with other classes) based on their inheritances establishes a hierarchy of objects (or classes), which may facilitate code reuse between objects (and classes), extensions of objects (and classes), and so on.

Typically, systems are able to extract data associated with objects having static, or unchanging, inheritances with other objects (e.g., a child object has a static inheritance from one or more parent objects). For example, for a given object, conventional systems are configured to extract data reflective of unchanging relationships between the object and any parent/child objects, unchanging attributes between the object and any parent/child objects, and so on.

As described herein, the data extraction system 130 is configured to extract temporal, time-based, or time-specific data or information for objects with dynamic inheritances, such as objects stored in the object database 140.

The data extraction system 130 may include functional modules that are implemented with a combination of software (e.g., executable instructions or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the data extraction system 130 may include an object event module 132, a sequence module 134, and an evaluation module 136.

In some embodiments, the object event module 132 is configured and/or programmed to create a data set of events associated with an object and stored as data objects in the database 140. For example, the object event module 132 may store information associated with events for an object as a data set for the object, where an event includes or represents a change to an attribute or a change to an inheritance for the object at a specific point in time.

Thus, the database 140 may include one or more data structures for the object that relate to changes to inheritances or attributes for the object and specific points in time at which the changes to the inheritances or the attributes occur for the object. For example, the database 140 may include a first data object (e.g., a data structure) associated with a changing inheritance for the object from a first point in time to a second point in time and a second data object associated with a changing attribute for the object from a third point in time to a fourth point in time. It may also include one or more data objects that relate to a changing of parent objects inherited by the object at a first point in time and/or one or more data objects that relate to a changing of attributes associated with the object at a first point in time.

In some embodiments, the sequence module 134 is configured and/or programmed to generate a time-based sequence of events for the object. For example, the sequence module 134 may access the data set for the object and generate a timeline or sequence separated into time periods representative of the events associated with the object, where the time periods are based on the specific points in time when the changes to the inheritance or attributes of the object occurred.

In some cases, the sequence module 134 generates a timeline for each inheritance or attribute that is associated with the object and/or is changed during a historical time period for the object. The sequence module 134, therefore, may generate a sequence that includes one or more attribute timelines representative of changes to attributes of the object, wherein the one or more attribute timelines are each separated into time periods, with one time period for each change to a single attribute of the object, and/or one or more inheritance timelines representative of changes to inheritances of the object, wherein the one or more inheritance timelines are each separated into time periods, with one time period for each change to a single inheritance of the object.

In some embodiments, the evaluation module 136 is configured and/or programmed to evaluate a query for information associated with the object using the generated time-based sequence of events. For example, the evaluation module 136 evaluates the query for information by reconstructing inheritance information and attribute information for the object using the time-based sequence of events, and it determines one or more facts for the object, where a fact is a truth about the object during a specific time period for the object. Therefore, the fact, being based on reconstructed information for the object, may answer or act as a result for the query.

Thus, as described herein, the data extraction system 130 may build, create, generate, or construct sequences of temporal events for an object with dynamic inheritances in order to extract data for the object at various different time periods.

Figure 2:
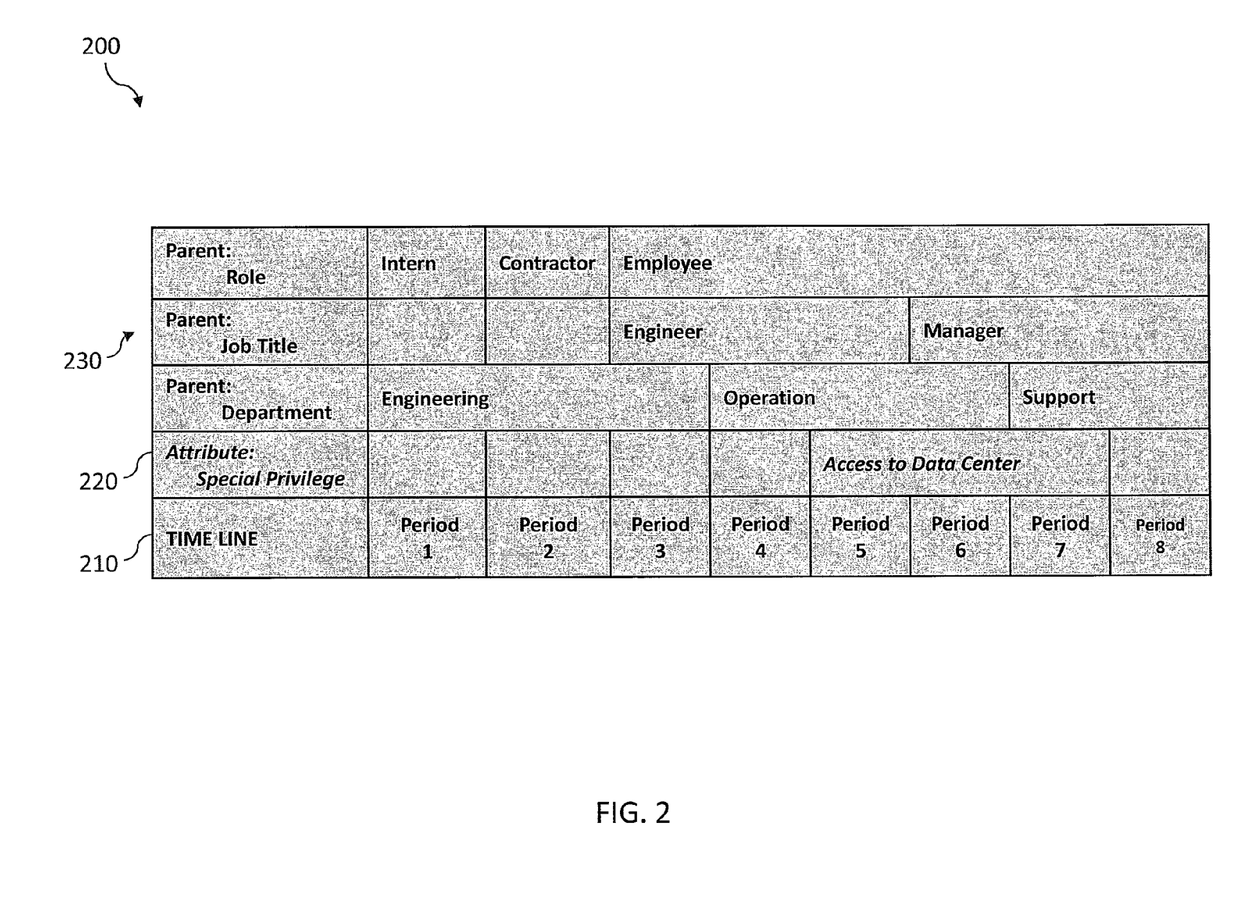
FIG. 2 is a diagram illustrating a generated sequence of change events for an object having dynamic inheritances.

FIG. 2 depicts a generated or constructed sequence of change events for an object with dynamic inheritances, such as objects representing an employee in an enterprise database, for different time periods. As shown, the generated sequence 200 includes a timeline 210, broken into different time periods (e.g., Period 1, Period 2, . . . , Period 8) at which a change associated with the object occurred.

The sequence includes a first timeline 220 associated with a change to an attribute assigned to the objects representing the employee in the database (e.g., John obtained a special privilege of accessing the data center in Periods 5-7 of the timeline), and multiple timelines 230 associated with changing parent objects (or nodes) for the objects representing the employee. For example, the employee's role is represented as a parent object of "role," with child objects for the "role" changing over time (e.g., an "intern" child object for Period 1, a "contractor" child object for Period 2, and an "employee" child object for Periods 3-8). Thus, the object associated with "role" has a dynamic inheritance that changes from a first child object ("intern") to a second child object ("contractor") to a third child object ("employee").

Similarly, as shown in FIG. 2, a parent object of "department" has a dynamic inheritance that changes from an "engineering" child object for Periods 1-3 to an "operation" child object for Periods 4-6 and a "support" data object for Periods 7-8, and a parent object of "job title" has a dynamic inheritance that changes from no child object in Periods 1-2 to an "engineer" child object in Periods 3-5 and a "manager" child object in Periods 6-8.

In extracting data to satisfy queries, the system 130, in some cases, extracts attributes and inheritances beginning at the lowest inheritance/object level, identifies immediate parent objects, extracts attributes and inheritances of immediate parent objects, and continues up a hierarchy of objects until the highest object level is reached.

By extracting facts from the generated sequence 200, the system 130 may answer queries (e.g., such as porting history queries, as described herein) as normal objects and/or execute processes after initial attributes and facts are recovered at the start of a certain period.

Figure 3:
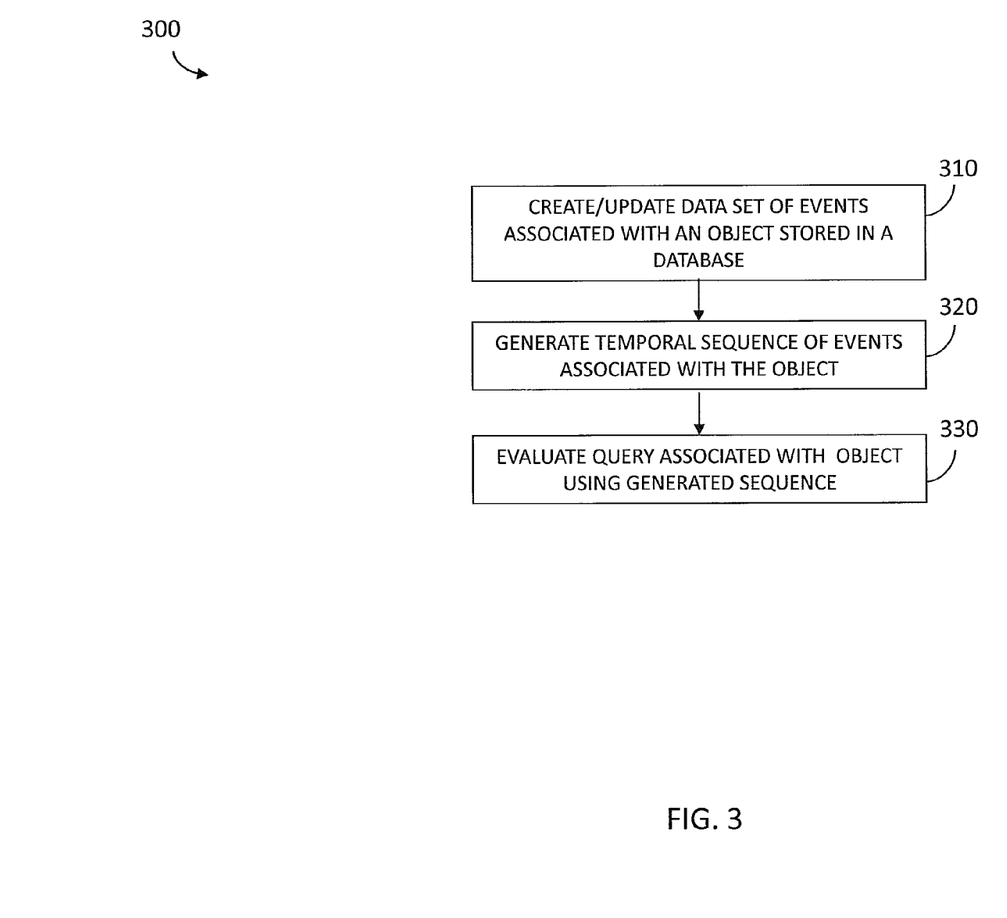
FIG. 3 is a flow diagram illustrating a method for extracting data for an object having dynamic inheritances.

Therefore, as described herein, the data extraction system 130 may facilitate the extraction of facts for an object from a database storing attribute and inheritance information for objects. FIG. 3 is a flow diagram illustrating a method 300 for extracting data for an object having dynamic inheritances. Aspects of the method 300 may be performed by the data extraction system 130 and, accordingly, is described herein merely by way of reference thereto. It will be appreciated that the method 300 may be performed on any suitable hardware.

In operation 310, the data extraction system 130 creates a data set of events associated with the object having dynamic inheritances, where an event includes a change to an attribute or a change to an inheritance for the object at a specific point in time. For example, the object event module 132 may store information associated with events for an object as a data set for the object, where an event includes or represents a change to an attribute or a change to an inheritance for the object at a specific point in time.

As described herein, the database 140 may include one or more data structures for the object that relate to changes to inheritances or attributes for the object and specific points in time at which the changes to the inheritances or the attributes occur for the object. For example, the database 140 may include a first data object associated with a changing inheritance for the object from a first point in time to a second point in time and a second data object associated with a changing attribute for the object from a third point in time to a fourth point in time. It may also include one or more data objects that relate to a changing of parent objects inherited by the object at a first point in time and/or one or more data objects that relate to a changing of attributes associated with the object at a first point in time.

In operation 320, the system 130 generates a temporal sequence of events for the object having dynamic inheritances, where the generated temporal sequence of events includes a timeline separated into time periods representative of the events associated with the object. For example, the sequence module 134 may generate a sequence that includes one or more attribute timelines representative of changes to attributes of the object, wherein the one or more attribute timelines are each separated into time periods, with one time period for each change to a single attribute of the object, and/or one or more inheritance timelines representative of changes to inheritances of the object, wherein the one or more inheritance timelines are each separated into time periods, with one time period for each change to a single inheritance of the object.

In operation 330, the system 130 evaluates a query for information associated with the object having dynamic inheritances using the generated temporal sequence of events. For example, the evaluation module 136 evaluates the query for information by reconstructing inheritance information and attribute information for the object, using the time-based sequence of events, and determines one or more facts for the object, where a fact is a truth about the object during a specific time period for the object. Therefore, the fact, being based on reconstructed information for the object, may answer or act as a result for the query.

Thus, in some embodiments, the data extraction system 130 generates sequences of time-specific changes to objects in order to construct facts for the objects, which are used to satisfy queries associated with the objects, among other things.

Examples of Constructing Porting Histories for Telephone Numbers

As described herein, a telephone number is an example of an object with dynamic inheritances, given that telephone numbers, throughout their lifetime, are transferred from one owner (or subscriber) to another, from one service provider to another, from one network endpoint to another, from one device to another, and so on.

Therefore, various aspects of the data extraction system 130 may be utilized in generating and constructing a telephone number (TN) porting history for a telephone number. Porting, as described herein, is associated with a subscriber or user maintaining his or her number from one service provider to another. Using constructed porting histories, various entities or systems (e.g., law enforcement) may obtain various facts or information related to a telephone number and its various attributes, among other things.

Figure 4:
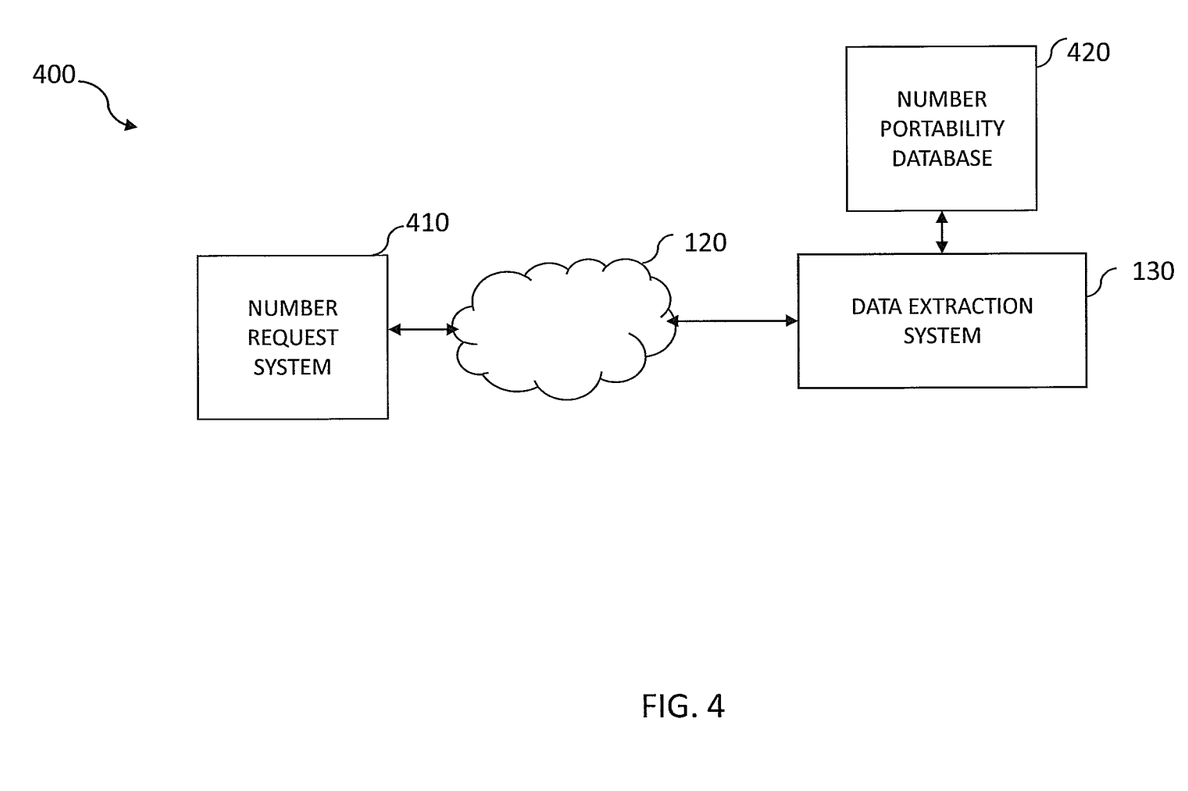
FIG. 4 is a block diagram illustrating a computing environment for handling telephone porting queries for a Number Portability Administration Center (NPAC).

FIG. 4 is a block diagram illustrating a computing environment 400 for handling telephone porting queries for a Number Portability Administration Center (NPAC). The environment 400 may include a number request system 410, which receives or facilitates user requests or queries (e.g., a query containing a telephone number) for porting histories for telephone numbers. The number request system 410 may publish application programming interfaces (APIs) and/or provide various graphical user interfaces (GUIs) that facilitate user input associated with requested TNs.

The number request system 410, upon receiving a request or query for the porting history for a telephone number, may perform some or all of the methods described herein with respect to the system 130 to construct one or more timelines of information associated with changing attributes for the telephone number. For example, the system 130, upon receiving a requested number from the number request system 410, may query a number portability database 420 for previous, historical or current information associated with the number.

The number portability database 420 includes a vast amount of data associated with the telephone number and its porting history. For example, the number portability database 420 may store previous or current service provider information and service endpoint information, such as an SMS SS7 address, a switch/routing number, a SIP URI, and so on.

The number portability database 420, therefore, may store various types of information, data objects, or records.

Example types of information, data, or records stored in the number portability database 420 include:

SPID—telephone service provider information, including service provider identifiers (SPID), carrier types, carrier names, service regions, and so on;

NPA_NXX—information about NPA NXX, such as SPID, activation timestamps, and so on;

LRN—information of location routing numbers, activation timestamp, and so on;

NPA_NXX_X—information about number pooling blocks involved in pool block activations;

BLOCK—Information of active number pooling block, such as ownership, LRN, SS7, network addresses, internet service endpoints/URLs, and so on;

SV—Ported TN subscription version data, such as ownership, LRN, SS7 network addresses, internet service endpoints/URLs, and so on;

NPA_SPLIT—Information about NPAs to be split into two;

NPA_NXX_SPLIT—Information related to NPA NXXs to be moved from an old NPA code to a new NPA code due to an NPA split; and so on.

Each data object includes or is associated with various different attributes, as described herein. Data objects may share common attributes (e.g., "update" or "delete," or a timestamp), or may have various data object specific attributes. Example attributes specific to the data objects as are follows:

A. Data attributes related to TN and/or BLOCK data objects:

Service Provider Information, such as REGION_ID, SPID, ALT_SPID (alternative SPID), and/or LAST_ALT_SPID (last alternative SPID);

TN/BLOCK and Routing Information, such as TN or NPA_NXX_X (BLOCK only), and/or LRN;

Timestamps, such as Activation Timestamp, Last Modification Timestamp, and/or Deactivation Timestamp;

SS7 Network Addresses, such as CLASS_DPC/SSN (Custom Local Area Signaling Services destination point code), LIDB_DPC/SSN (Line Information Database destination point code)/, ISVM_DPC/SSN (Inter-Switch Voice Mail destination point code), CNAM_DPC/SSN (Caller ID with name destination point code), and/or WSMSC_DPC/SSN (Wireless Short Message Service Center destination point code);

Internet Service URIs, such as VOICE_URI (Voice-over-IP URI), MMS_URI (Multimedia service URI), POC_URI (Point of contact service URI), PRES_URI (Presence service URI), and/or SMS_URI (Short message service URI);

Telephone Type, such as SV TYPE (e.g., Wireline, Wireless, VOIP, VOWiFi, Pre-paid Wireless, and so on);

Number Portability Type (only for TN objects), such as LNP_TYPE (Intra-SP or Inter-SP);

End user location/billing information, such as END_USER_LOCATION_TYPE (TN only), END_USER_LOCATION (TN only), ALT_END_USER_LOCATION_TYPE, ALT_END_USER_LOCATION, BILLING_ID (TN only), and/or ALT_BILLING_ID; and so on;

B. Data attributes related to SPID (Service Provider) objects include REGION_ID, SPID, NAME SP_TYPE (e.g., Wireless, Wireline, VOIP carriers, and so on), Creation Timestamp, Last Modification Timestamp, Deletion Timestamp, and so on;

C. Data attributes related to LRN (Location Routing Number) objects include REGION_ID, SPID, LRN, Creation Timestamp, Last Modification Timestamp, Deletion Timestamp, and so on;

D. Data attributes related to NPA_NXX (CO) objects include REGION_ID, SPID, NPA, NXX, Creation Timestamp, Effective Timestamp, Last Modification Timestamp, Deletion Timestamp, and so on;

E. Data attributes related to NPA_NXX_X (Pre-activation BLOCK data) objects include REGION_ID, SPID, NPA_NXX_X, Creation Timestamp, Effective Timestamp (Corresponding to Activation timestamp of the BLOCK object), Last Modification Timestamp, Deletion Timestamp, and so on;

F. Data attributes related to NPA_NXX (CO) objects include REGION_ID, SPID, NPA, NXX, Creation Timestamp, Effective Timestamp, Last Modification Timestamp, Deletion Timestamp, and so on;

G. Data attributes related to NPA_SPLIT (e.g., associated with permissive dialing) objects include REGION_ID, OLD_NPA, NEW_NPA, START_PDP (start of permissive dialing period), END_PDP (end of permissive dialing period), Creation Timestamp, Last Modification Timestamp H. Data attributes related to NPA_NXX_SPLIT objects for NXX objects involved in an NPA split include REGION_ID, OLD_NPA, NEW_NPA, NXX, START_PDP (start of permissive dialing period), END_PDP (end of permissive dialing period), Creation Timestamp, Last Modification Timestamp, and so on.

Of course, the data objects may have other attributes not specified herein.

As described herein, the number portability database 420 may store objects, such as objects representing telephone numbers, along with various parent or child objects. For example, for a given TN of "703-555-1234," the following object relationships are stored:

An object of a 3-digit area code (a numbering plan area or "NPA"), such as "703," is a parent object of a 6-digit NPA-NXX object (e.g., a central office or "CO" code that indicates a service provider and switch associated with the telephone number), such as "703-555," which is a parent object of a 7-digit BLOCK object (e.g., a "thousands block" or grouping of a thousand numbers having the same CO code), such as "703-555-1," which is a parent object of the telephone number "703-555-1234." The database 420, therefore, stores the objects, their attributes, and the dynamically changing relationships between the objects, as described herein.

Additional examples of changes to current and historical data stored in the number portability database 420 includes changes to subscription version (SV) historical records, BLOCK historical records, NPA-NXX historical records, SPID migrations, SV/BLOCK/LRN/NPA-NXX-X/NPA-NXX historical records, NPA-NXX splits, and SV/BLOCK Deactivation/Reactivation events combined by the number portability database 420 into one SV/BLOCK Modification event, which includes different SV/BLOCK IDs, and different activation timestamps and different LNPType values for SV records, where InterSP TN porting can be identified by different SPIDs, in addition to LNPType 0, and IntraSP TN porting can be identified by LNPType 1.

Therefore, the ownership or attributes of the different objects changes from one time period to another, and the ownership and/or attributes of the telephone number may be inherited from its parent objects BLOCK or NPA-NXX.

The data extraction system 130, performing the methods described herein, may store and/or track changes to the ownership or attributes of a TN or its parent objects. For example, the system 130 may store or track an activation or creation of a TN, BLOCK, or CO code, the deactivation or deletion of a TN, BLOCK, or CO code, the ownership change history with respect to the different objects (e.g., a change to a subscription version (SV) or service provider (SPID) associated with the TN), the change of attributes, such as SS7 or other signaling endpoints within a network associated with the TN, and so on.

Thus, example attributes or inheritances for a TN tracked by the system 130 include changes to SPID information, NPA-NXX information, NPA-NXX-X information, location routing number (LRN) information, BLOCK information, subscription version (SV) information, SPID migration information, NPA-NXX split information, and other changes to parent or child objects associated with a telephone number.

Figure 5:
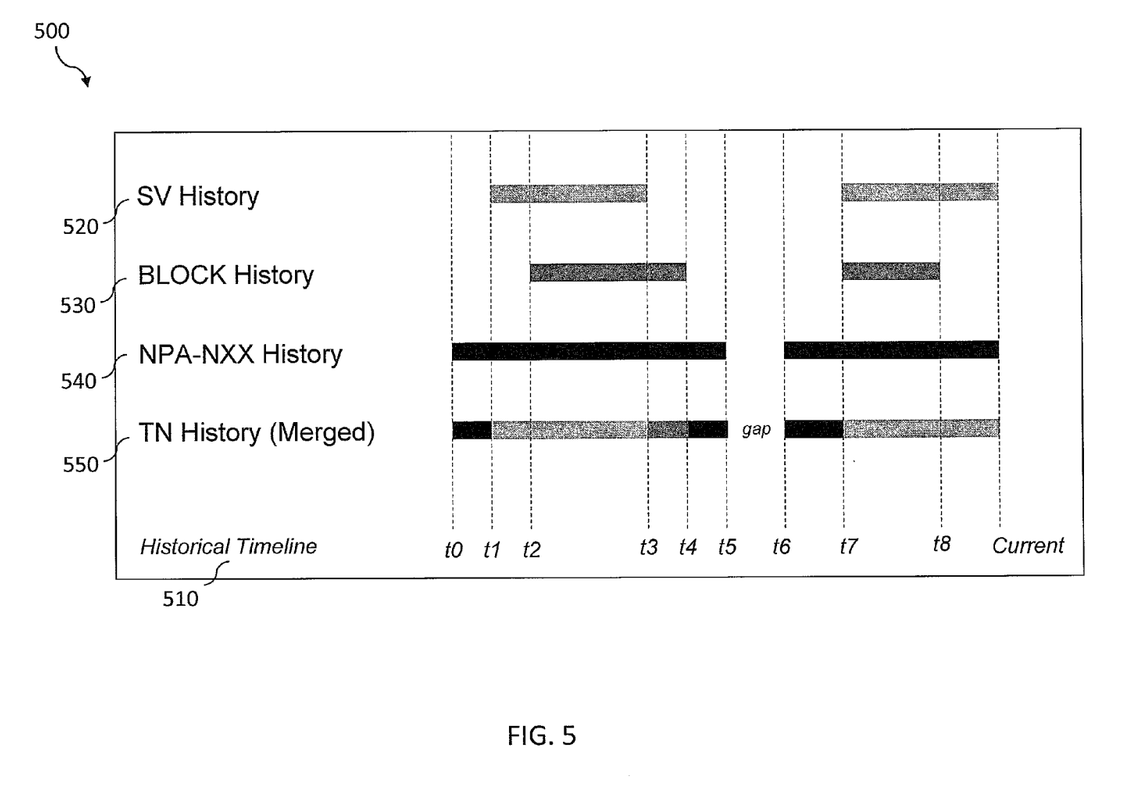
FIG. 5 is a diagram illustrating a generated sequence of changes to attributes for a telephone number.

As described herein, the data extraction system 130 may build or generate an event sequence, which includes one or more timelines for associated objects having changing inheritances or attributes, for an object, such as a telephone number. FIG. 5 is a diagram illustrating a generated sequence 500 of changes to attributes for a telephone number.

As depicted, the sequence includes a timeline 510 that is separated into time periods (e.g., t1, t2, . . . , t8, and current) based on events occurring with respect to objects associated with a telephone number (e.g., the object for the TN, or various parent objects). The sequence 500 includes three different change or historical lists or timelines generated from data stored in the number portability database 420 (and described herein), including an SV history timeline 520 that is based on data from the SV_AUDIT and SV tables, a BLOCK history timeline 530 that is based on data from the BLOCK_AUDIT and BLOCK tables, and an NPA_NXX history timeline 540 that is based on data from the NPA_NXX_AUDIT and NPA_NXX tables. The time periods are associated with timestamps (e.g., start and end timestamps) for historical or live data records stored in the tables.

Using this data, the system 130 constructs a merged TN history timeline 550 for the telephone number, as shown in FIG. 5. Therefore, in some cases the system 130 is configured to generate a TN history, or porting history, for a telephone number that is based on the changes associated with parent objects (e.g., "SV" objects, "BLOCK" objects, and/or "NPA_NXX" objects) of the TN object.

The merging of the different timelines into the TN history timeline 550 may be represented by the following SET operation:

History{BLOCK}:=Change{BLOCK}UNION
(Change{NPA-NXX}MINUS
Change{BLOCK}); and

History{*TN*}:=Change{*SV*}UNION
(History{BLOCK}MINUS Change{*SV*}).

In some cases, the system 130, in constructing a history timeline for a telephone number (or other object) using data from the number portability database 420, may have time periods with missing data (e.g., t5 to t6). In these cases, the system 130 may obtain data from other external sources, such as from the North American Numbering Plan Administration (NANPA) and associated databases, the Local Service Management System (LSMS) and associated databases, and so on. Thus, data from various external sources, such as NANPA or other pooling sources, may be used as reference data in the absence of NPAC/LSMS historical data for certain time periods.

Further, when two or more adjacent records contain the same NPAC data, the system 130 may merge the records into one single record that spans their lifespans. For example, the system 130 may merge SPID data or perform other merge operations. In addition, the system 130 may traverse the TN change list or the TN history timeline 550 in order to retrieve data for a telephone number at a specific point in time or for a specific time period.

Therefore, the system 130 is configured to generate timelines for various objects associated with the TN and to generate a TN porting history based on merging data from the different timelines to construct the TN porting history. For example, given that a TN has a set of attributes (e.g., SV) and may be related to BLOCKs, COs, and/or other parent objects, these objects likewise inherit similar attributes, such as SV information, activation timestamps, and so on. Therefore, these objects, the TN porting history, as described herein, may include or provide some or all data fields returned for TN history queries.

Figure 6:
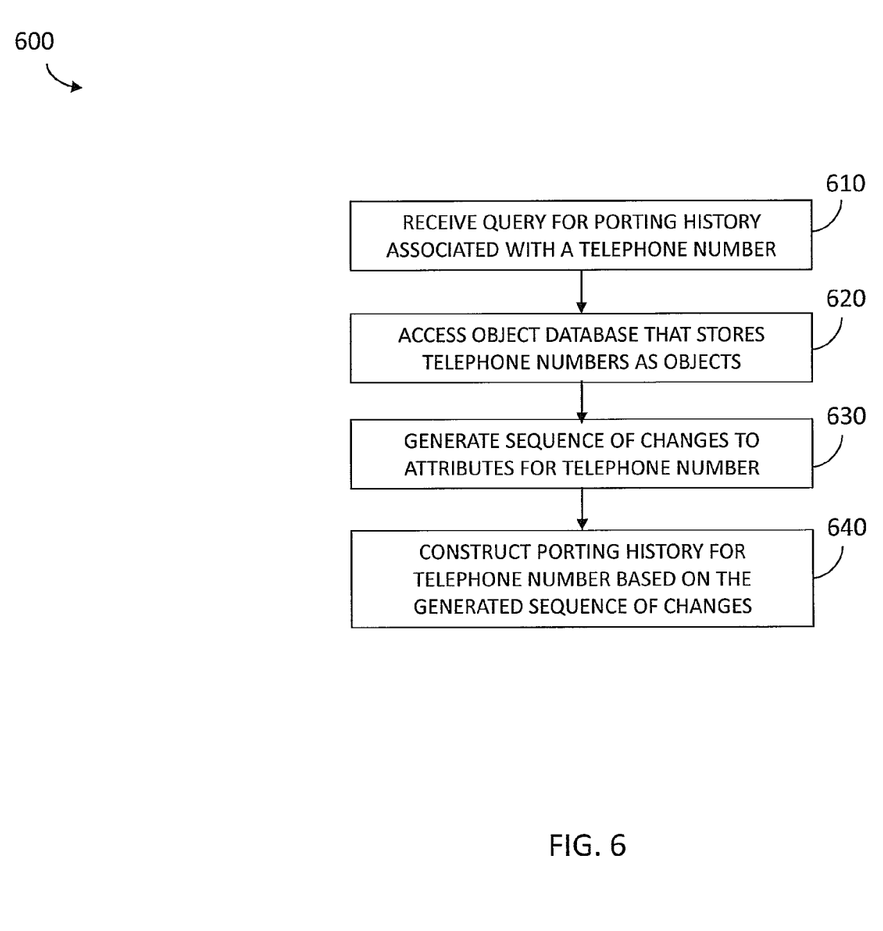
FIG. 6 is a flow diagram illustrating a method for determining number porting information for a telephone number.

As described herein, the system 130 performs various methods or operations when determining the porting history for a telephone number. FIG. 6 is a flow diagram illustrating a method 600 for determining number porting information for a telephone number. Aspects of the method 600 may be performed by the data extraction system 130 and, accordingly, is described herein merely by way of reference thereto. It will be appreciated that the method 600 may be performed on any suitable hardware.

In operation 610, the data extraction system 130 receives a query for porting history information associated with a telephone number. For example, the system 130 may receive a query via the number request system 410 that includes a telephone number and a request for historical information associated with the TN.

In operation 620, the system 130 accesses an object database of objects that represent telephone numbers and associated information for the telephone numbers, where the database stores data representative of events over a time period that occurred with respect to the telephone number, and where an event includes a change to an attribute associated with the telephone number at a point in time within the time period. For example, the object event module 132 may store information associated with events for an object (the TN) as a data set for the object, where an event includes or represents a change to an attribute or a change to an inheritance for the TN at a specific point in time.

In operation 630, the system 130 generates a timeline for the telephone number based on information stored by the object database, such as the number portability database 420. For example, the sequence module 134 may access the data set for the object and generate a timeline or sequence (e.g., sequence 500) separated into time periods representative of the events associated with the object, where the time periods are based on the specific points in time when the changes to the inheritance or attributes of the object occurred.

As described herein, the system 130 may utilize data records from different objects associated with a TN object when generating a change or event sequence for the TN object. For example, the sequence module 134 may generate a first timeline for historical attribute information associated with a service provider for the telephone number, generate a second timeline for historical attribute information associated with a BLOCK parent object for the telephone number (where BLOCK represents a thousands block of telephone numbers that includes the telephone number), and generate a third timeline for historical attribute information associated with a CO code parent object for the telephone number (where the CO code includes the first six digits (NPA-NXX) of any telephone number and indicates a service provider and switch associated with the telephone number.

As another example, the sequence module 134 may generate a first timeline for historical attribute information associated with the telephone number, a second timeline for historical attribute information associated with a BLOCK parent object for the telephone number, and a third timeline for historical attribute information associated with a CO code parent object for the telephone number.

In operation 640, the system 130 constructs a porting history record for the telephone number that is based on the timeline generated for the telephone number. For example, the sequence module 134 constructs the merged TN history timeline 550 (merging the other associated timelines) of historical attribute information for the telephone number.

In some embodiments, the system 130 presents a report that includes the constructed porting history record for the telephone number to a device that submitted the query. For example, the system 130 may generate a report that includes the porting history for the telephone number, identifying the service providers, owners, and so on for a telephone number throughout its history, both overall and at specific points in time.

Thus, in some embodiments, the system 130 may perform various different data extraction operations for objects with dynamic inheritance in order to generate and/or construct the porting history for a telephone number.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein,"

"above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Furthermore, any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention not only may include additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in a specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A method for providing porting history information for a telephone number, the method comprising:
   receiving a query for porting history information associated with the telephone number;
   accessing an object database of objects that represent telephone numbers and associated information for the telephone numbers,
      wherein the object database stores data representative of events over a time period that occurred with respect to the telephone number, and
      wherein an event includes a change to an attribute associated with the telephone number at a point in time within the time period;
   generating a timeline for the telephone number based on information stored by the object database,
      wherein the generated timeline is separated into time periods representative of the events that occurred with respect to the telephone number; and
   constructing a porting history record for the telephone number that is based on the timeline generated for the telephone number.

2. The method of claim 1, wherein generating a timeline for the telephone number based on information stored by the object database includes:
   generating a first timeline for historical attribute information associated with a service provider for the telephone number;
   generating a second timeline for historical attribute information associated with a BLOCK parent object for the telephone number,
      wherein BLOCK represents a thousands block of telephone numbers that includes the telephone number;
   generating a third timeline for historical attribute information associated with a CO code parent object for the telephone number,
      wherein the CO code includes the first six digits of the telephone number and indicates a service provider and switch associated with the telephone number; and
   combining the first timeline, the second timeline, and the third timeline into a merged timeline of historical attribute information for the telephone number.

3. The method of claim 1, wherein generating a timeline for the telephone number based on information stored by the object database includes:
   generating a first timeline for historical attribute information associated with the telephone number;
   generating a second timeline for historical attribute information associated with a BLOCK parent object for the telephone number,
      wherein the BLOCK represents a thousands block of telephone numbers that includes the telephone number;
   generating a third timeline for historical attribute information associated with a CO code parent object for the telephone number,
      wherein the CO code includes the first six digits of the telephone number and indicates a service provider and switch associated with the telephone number; and
   combining the first timeline, the second timeline, and the third timeline into a merged timeline of historical attribute information for the telephone number.

4. The method of claim 1, wherein the change to an attribute associated with the telephone number at a point in time within the time period includes a change to subscription version data associated with the telephone number,
   wherein the subscription version data associated with the telephone number includes ownership information, LRN information, SS7 network addresses, and internet service endpoints for the telephone number.

5. The method of claim 1, wherein the change to an attribute associated with the telephone number at a point in time within the time period includes a change to telephone service provider information for the telephone number and a change to subscription version data associated with the telephone number.

6. The method of claim 1, wherein the change to an attribute associated with the telephone number at a point in time within the time period includes an event associated with activation of the telephone number, an event associated with activation of a BLOCK of telephone numbers that includes the telephone number, or an event associated with activation of a central office code for telephone numbers that is part of the telephone number.

7. The method of claim 1, wherein the change to an attribute associated with the telephone number at a point in time within the time period includes a change to an owner of a parent object of the telephone number,
wherein a parent object of the telephone number may represent a SPID, NPA, NPA-NXX, NPA-NXX-X, BLOCK, local routing number, or service provider associated with the telephone number.

8. The method of claim 1, further comprising:
presenting a report that includes the constructed porting history record for the telephone number to a device that submitted the query.

9. The method of claim 1, wherein the object database is a database associated with a Number Portability Administration Center (NPAC).

10. The method of claim 1, wherein the events that occurred with respect to the telephone number include events that occurred with respect to parent objects for the telephone number.

11. A non-transitory computer-readable medium whose contents, when executed by a computing system, cause the computing system to perform a method for providing porting history information for a telephone number, the method comprising:
receiving a query for porting history information associated with a telephone number;
accessing an object database of objects that represent telephone numbers and associated information for the telephone numbers,
wherein the object database stores data representative of events over a time period that occurred with respect to the telephone number, and
wherein an event includes a change to an attribute associated with the telephone number at a point in time within the time period;
generating a timeline for the telephone number based on information stored by the object database,
wherein the generated timeline is separated into time periods representative of the events that occurred with respect to the telephone number; and
constructing a porting history record for the telephone number that is based on the timeline generated for the telephone number.

12. The non-transitory computer-readable medium of claim 11, wherein generating a timeline for the telephone number based on information stored by the object database includes:
generating a first timeline for historical attribute information associated with a service provider for the telephone number;
generating a second timeline for historical attribute information associated with a BLOCK parent object for the telephone number,
wherein the BLOCK represents a thousands block of telephone numbers that includes the telephone number;
generating a third timeline for historical attribute information associated with a CO code parent object for the telephone number,
wherein the CO code includes the first six digits of the telephone number and indicates a service provider and switch associated with the telephone number; and
combining the first timeline, the second timeline, and the third timeline into a merged timeline of historical attribute information for the telephone number.

13. The non-transitory computer-readable medium of claim 11, wherein generating a timeline for the telephone number based on information stored by the object database includes:
generating a first timeline for historical attribute information associated with the telephone number;
generating a second timeline for historical attribute information associated with a BLOCK parent object for the telephone number,
wherein the BLOCK represents a thousands block of telephone numbers that includes the telephone number;
generating a third timeline for historical attribute information associated with a CO code parent object for the telephone number,
wherein the CO code includes the first six digits of the telephone number and indicates a service provider and switch associated with the telephone number; and
combining the first timeline, the second timeline, and the third timeline into a merged timeline of historical attribute information for the telephone number.

14. The non-transitory computer-readable medium of claim 11, wherein the change to an attribute associated with the telephone number at a point in time within the time period includes a change to an owner of the telephone number.

15. The non-transitory computer-readable medium of claim 11, wherein the change to an attribute associated with the telephone number at a point in time within the time period includes a change to a signaling endpoint associated with the telephone number.

16. The non-transitory computer-readable medium of claim 11, wherein the change to an attribute associated with the telephone number at a point in time within the time period includes an event associated with activation of the telephone number, an event associated with activation of a BLOCK of telephone numbers that includes the telephone number, or an event associated with activation of a central office code for telephone numbers that is part of the telephone number.

17. The non-transitory computer-readable medium of claim 11, wherein the change to an attribute associated with the telephone number at a point in time within the time period includes a change to an owner of a parent object of the telephone number,
wherein a parent object of the telephone number may represent a SPID, NPA, NPA-NXX, NPA-NXX-X, BLOCK, local routing number, or service provider associated with the telephone number.

18. The non-transitory computer-readable medium of claim 11, further comprising:
presenting a report that includes the constructed porting history record for the telephone number to a device that submitted the query.

19. The non-transitory computer-readable medium of claim 11, wherein the events that occurred with respect to the telephone number include events that occurred with respect to parent objects for the telephone number.

20. A system for constructing a porting history for a telephone number, the system comprising:
- an object module that accesses an object database of objects that represent telephone numbers and associated information for the telephone numbers,
  - wherein the object database stores data representative of events over a time period that occurred with respect to the telephone number, and
  - wherein an event includes a change to an attribute associated with the telephone number at a point in time within the time period;
- a timeline module that generates a timeline for the telephone number based on information stored by the object database,
  - wherein the generated timeline is separated into time periods representative of the events that occurred with respect to one or more parent objects associated with the telephone number within the object database; and
- a construction module that constructs a porting history record for the telephone number that is based on the timeline generated for the telephone number.

* * * * *